(12) United States Patent
Wunch et al.

(10) Patent No.: US 11,111,150 B2
(45) Date of Patent: Sep. 7, 2021

(54) FACILE DIRECT FUNCTIONALIZATION OF PRISTINE GRAPHENE NANOPARTICLES

(71) Applicant: Board of Regents, The University of Texas System, Austin, TX (US)

(72) Inventors: Melissa A. Wunch, Dallas, TX (US); Samsuddin F Mahmood, Plano, TX (US); Duck J Yang, Flower Mound, TX (US)

(73) Assignee: BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 31 days.

(21) Appl. No.: 16/566,803

(22) Filed: Sep. 10, 2019

(65) Prior Publication Data

US 2020/0087150 A1    Mar. 19, 2020

Related U.S. Application Data

(60) Provisional application No. 62/728,970, filed on Sep. 10, 2018.

(51) Int. Cl.
*C01B 32/194* (2017.01)
*C08L 63/00* (2006.01)
(Continued)

(52) U.S. Cl.
CPC ............ *C01B 32/194* (2017.08); *C08K 3/042* (2017.05); *C08L 63/00* (2013.01); *C08L 75/00* (2013.01);
(Continued)

(58) Field of Classification Search
CPC .............. C01B 32/194; C01B 2204/32; C01B 2204/30; C08L 63/00; C08L 75/00;
(Continued)

(56) References Cited

PUBLICATIONS

Wunch, Melissa Ann. Functionalization and Dispersion Stability Study of Graphene Materials in 2K Urethane Coating System and Expanded Interlayer Spacing of Vanadium Oxide Nanomaterials for Energy Storage Applications. Diss. 2017.*

(Continued)

*Primary Examiner* — Richard M Rump
(74) *Attorney, Agent, or Firm* — Parker Highlander PLLC

(57) ABSTRACT

Graphene is a single layer carbon-based material known for high strength, high flexibility, high electrical conductivity, high surface area, hydrophobicity and barrier property. Introduction of surface functional groups on graphene enhances most of these properties. A facile and economical process to prepare amine and fluoride functionalized graphenes is disclosed. The disclosed processes utilize direct functionalization of pristine graphene without pre-functionalization (GO). Successful functionalization of both aminated and fluorinated graphenes were confirmed by the analyses of FT-IR, thermal gravimetric analysis (TGA), Raman, UV-Vis, and dispersion study. Amine functional groups can react with epoxy resin and urethane resin to form a covalent bond, and fluorinated graphene can give high hydrophobicity and durability, therefore both can be applied as a material or a component in polymer and composite coatings for corrosion protection, moisture or gas barriers.

20 Claims, 18 Drawing Sheets

(51) Int. Cl.
  *C08L 75/00* (2006.01)
  *C08K 3/04* (2006.01)
  *B82Y 30/00* (2011.01)
  *B82Y 40/00* (2011.01)
(52) U.S. Cl.
  CPC ............... *B82Y 30/00* (2013.01); *B82Y 40/00* (2013.01); *C01B 2204/32* (2013.01)
(58) Field of Classification Search
  CPC .......... C08K 3/042; C08K 9/04; B82Y 30/00; C09D 163/00; C09D 175/04
  See application file for complete search history.

(56) References Cited

PUBLICATIONS

Arbuzov, A. A., et al. Preparation of amino-functionalized graphene sheets and their conductive properties. Diss. Sumy State University, 2013.*

Hu, Yizhe, et al. "Amino-functionalization of graphene sheets and the fabrication of their nanocomposites." Polymer composites 31.12 (2010): 1987-1994.*

Aguilar-Bolados, Héctor, et al. "Facile and scalable one-step method for amination of graphene using Leuckart reaction." Chemistry of Materials 29.16 (2017): 6698-6705.*

* cited by examiner

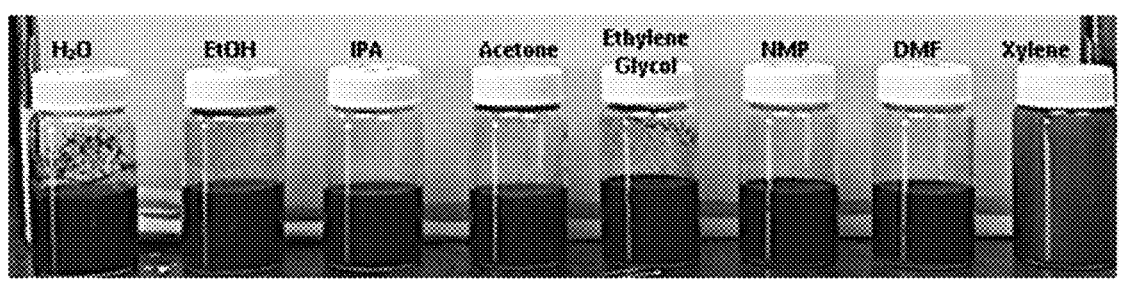
Day 0
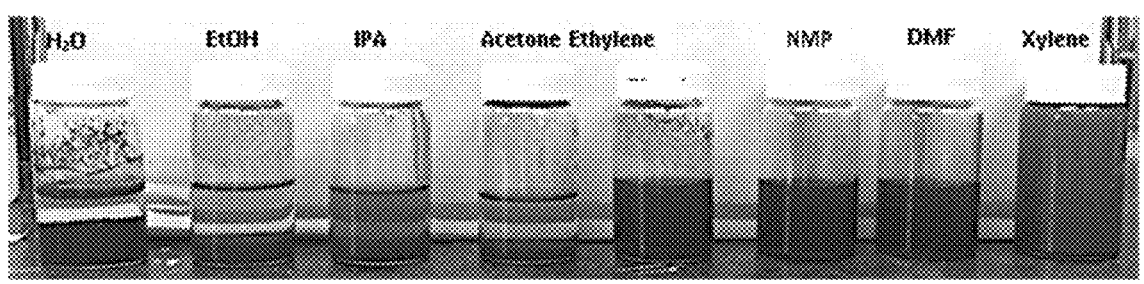
Day 60
Figure 7

Figure 13. a) SEM of FG 15 psi 24 hours (b) EDX analysis of same sample.

Figure 15. FTIR spectrum of pristine vs fluorinated graphene.

FACILE DIRECT FUNCTIONALIZATION OF PRISTINE GRAPHENE NANOPARTICLES

PRIORITY CLAIM

This application claims benefit of priority to U.S. Provisional Application Ser. No. 62/728,970, filed Sep. 10, 2018, the entire contents of which are hereby incorporated by reference.

FIELD

The present disclosure relates to the functionalization of graphene for graphene-based coatings and, more specifically, to methods of amination and fluorination of graphene.

BACKGROUND

Graphene is a single layered carbon-based material with sp$^2$ hybridized carbons arranged in a hexagonal lattice[1-5]. Due to its multifunctional properties, it has been used in a wide variety of applications such as electronics, corrosion protection, and energy storage[5-9]. These multifunctional properties include high flexibility, high surface area, good electrical conductivity, hydrophobicity, barrier property, and enhanced strength[3-5,10-12,32,33]. One gram of single layer graphene can cover up to 2630 square meters[34-37]. Taking advantage of the hydrophobic, high surface area, and barrier properties of graphene have led to its application as an additive in polymer coatings for corrosion protection[3,6,11,13,14]. To enhance these properties, functional groups have been introduced on the surface[15-20]. These functional groups help to enhance dispersion and surface properties of graphene[18-21]. Common functional groups introduced on the surface include: carboxyl, hydroxyl, epoxy, fluorine, and amine[1,12,22-24].

Functionalization with amine groups on the surface has been performed using a variety of amine sources[20,24-28]. These sources include para-phenylenediamine, ethylenediamine, trimethylamine, urea, ammonia, etc[17,20,24,25,28]. Each synthesis required that the graphite precursor be pre-functionalized to make graphene oxide (GO) using the Modified Hummer's method[2,29,30]. This treats the graphite with a series of strong oxidizers in order to place carboxyl (—COOH), hydroxyl (—OH), and epoxy groups on the surface[2,29,30]. The GO is then treated with the amine source to produce aminated graphene oxide (AGO). Tetsuka et al reported amination of GO using an aqueous urea solution[28]. This synthesis was performed in a Teflon lined autoclave which helps to raise the temperature to up to 180° C. to undertake amination[28]. The use of an autoclave increases the overall cost of the synthesis. This disclosure describes a solution to this problem, eliminating the need for pre-functionalization or use of high pressure equipment (e.g. Teflon lined autoclave).

In relation to direct fluorination, such as the polymer polyethylene, has been reported. This surface technique can functionalize up to a depth of 0.01 to 10 μm of the polymer, while leaving the bulk unchanged. This process may result in enhanced chemical resistance, and improved barrier properties[38].

Direct gas fluorination of graphene based materials such as graphene membranes, graphene films and graphene sheets were studied by Nair et al[39], Robinson et aL[40] and Jeon et al[41] respectively. They used XeF$_2$ as fluorination agent and conducted the reaction at 70° C., 30° C. and 350° C. temperature. CVD based graphene was also fluorinated by using XeF$_2$[42]. F$_2$ gas was used by Wang et al to fluorinate graphene oxide (GO)[43] whereas Ren et al and Zhou et al used F$_2$/N$_2$ gas mixture to fluorinate reduced graphene oxide (rGO)[44,45]. Highly ordered pyrolytic graphite was fluorinated using F$_2$ by Cheng et aL[46]. Kang and Li reported the preparation of fluorinated graphene from graphite fluoride[47]. Fluorinated graphene was prepared by direct fluorination of N, O-Doped graphene aerogel at different temperatures by Bi et al[48]. Large-scale synthesis of fluorinated graphene by rapid thermal exfoliation of highly fluorinated graphite was reported by Herraiz et al[49]. Liang et al[50] reported that fluorinated graphene was prepared from the use of fluorinated graphite. However, there is no report found in the literature where dilute F$_2$/N$_2$ gas mixture is used to fluorinate mechanically exfoliated graphene powder at room temperature.

SUMMARY

Disclosed herein is an embodiment of a method for preparing an aminated graphene wherein the aminated graphene is obtained in a reaction by reacting graphene with an aminating reagent in a solvent or a solvent-deionized water mixture. The graphene may be mechanically exfoliated graphene, mechanically exfoliated graphene nanoparticles or graphene film. In other embodiments, the graphene comprises at least one of reduced chemically exfoliated graphene or reduced chemically exfoliated graphene nanoparticles. The graphene nanoparticles (mechanically or chemically exfoliated) have a diameter in the range of 10 nm to 100 microns. In an embodiment, the mass percentage of carbon in the graphene is in the range of 99.0%-99.9%. In another embodiment, the mass percentage of carbon in the graphene is greater than 99.99%.

The aminating reagent may be urea, ethylenediamine, para-phenylenedianiine, diethylamine, trimethylamine or a combination thereof. In another embodiment, the ratio of the graphene and the urea is in the range of 0.1-4.0 by weight. The deionized water-solvent mixture includes at least one of: ethylene glycol, diethylene glycol, triethylene glycol, tetraethylene glycol, propylene glycol, any high boiling glycol, or a triol based solvent such as glycerol. The deionized water-solvent mixture has a deionized water content in the range of 5%-60% by volume, preferably 25%-50% by volume. The solvent may be ethylene glycol, diethylene glycol, triethylene glycol, tetraethylene glycol, propylene glycol, any high boiling glycol, a triol based solvent or a combination thereof.

The temperature of the reaction is in the range of 150-250° C., preferably at 200° C. at 1 atmospheric pressure, under reflux in air or under reflux in inert conditions. The duration of the reaction is in the range of 1-24 hours, preferably is in the range 1-10 hours, most preferably 1-5 hours.

In other embodiments, the aminated graphene resulting from the method is included as a component in a coating, a polymer (for example an engineering plastic), a composite or a polymer film, wherein the coating may be a urethane coating or an epoxy coating. In another embodiment, the aminated graphene resulting from the method is included as a component in a UV absorbing additive. In yet another embodiment, the aminated graphene resulting from the method is included as a component for a moisture barrier polymer composite, a moisture barrier film, a gas barrier polymer composite or a gas barrier film.

The aminated graphene compound, as prepared by the method disclosed herein, has a mass percentage of amine functional groups (—NH$_2$) in the range of 1%<—NH$_2$<50%, mass percentage of carbon is in the range of 30%<C %<99%. Additionally, the aminated graphene compound, as prepared by the method, typically has a mass percentage of oxygen in the range 0%<O %<0.1%.

In some embodiments, the aminated graphene compound, as prepared by the method disclosed herein, is included as a component in a coating, a polymer, a composite or a polymer film wherein the coating may be a urethane coating or an epoxy coating. In another embodiment, the aminated graphene compound, as prepared by the method disclosed herein, is included as a component in a UV absorbing additive.

In yet another embodiment, the aminated graphene compound, as prepared by the method disclosed herein, is included as a component for a moisture barrier polymer composite, a moisture barrier film, a gas barrier polymer composite or a gas barrier film.

Disclosed herein is an embodiment of a second method for preparing a fluorinated graphene wherein the fluorinated graphene is obtained by reacting graphene with a mixture of F$_2$ gas with an inert gas. The graphene may be mechanically exfoliated graphene, mechanically exfoliated graphene nanoparticles or graphene film. In other embodiments, the graphene may be reduced chemically exfoliated graphene or reduced chemically exfoliated graphene nanoparticles. The graphene nanoparticles (mechanically or chemically exfoliated) have a diameter in the range of 10 nm to 100 microns. In an embodiment, the mass percentage of carbon in the graphene is in the range of 99.0%-99.9%. In another embodiment, the mass percentage of carbon in the graphene is greater than 99.99%.

The inert-gas includes at least one of Helium, Nitrogen, Argon, Krypton, or Xenon. The F$_2$ gas has a mixture volume with percentage of F$_2$ in the range of 1-60%, preferably 10% and most preferably 5%. The inert gas has a mixture volume with percentage of inert-gas in the range of 40-99%, preferably 90% and most preferably 95%.

The temperature of the reaction is in the range of 0-100° C., preferably at room temperature and the pressure of the reaction is in the range of 1-200 psi, preferably 3-60 psi at room temperature, and most preferably 10-30 psi at room temperature. The duration of the reaction is in the range of 0.1-76 hours, preferably in the range 1-48 hours, most preferably in the range 24-48 hours.

In other embodiments, the fluorinated graphene is included as a component in a coating, a polymer, a composite or a polymer film. In another embodiment, the fluorinated graphene compound is included as a component in a UV absorbing additive. In yet another embodiment the fluorinated graphene is included as a component for a moisture barrier polymer composite, a moisture barrier film, a gas barrier polymer composite or a gas barrier film.

The fluorinated graphene, as prepared by the second method, has a mass percentage of fluorine in the range of 0.1%<F %<85% and the mass percentage of carbon is in the range of 30%<C %<99%. Additionally, the fluorinated graphene compound, as prepared by the second method, typically has a mass percentage of oxygen in the range 0%<O %<0.1% and a mass percentage of hydrogen is in the range 0%<H<0.1%.

In some embodiments, the fluorinated graphene, as prepared by the second method is included as a component in a coating, a polymer, a composite or a polymer film wherein the coating may be a urethane coating or an epoxy coating. In another embodiment, the fluorinated graphene compound, as prepared by the method disclosed herein, is included as a component in a UV absorbing additive.

In yet another embodiment, the fluorinated graphene compound, as prepared by the method disclosed herein, is included as a component for a moisture barrier polymer composite, a moisture barrier film, a gas barrier polymer composite or a gas barrier film.

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is a photograph of the AG dispersion in various solvents after initial dispersion in various solvents (day 0) and after 60 days (day 60);

DETAILED DESCRIPTION

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

I. FACILE DIRECT AMINATION METHOD OF PRISTINE GRAPHENE NANOPARTICLES

Figure 1:
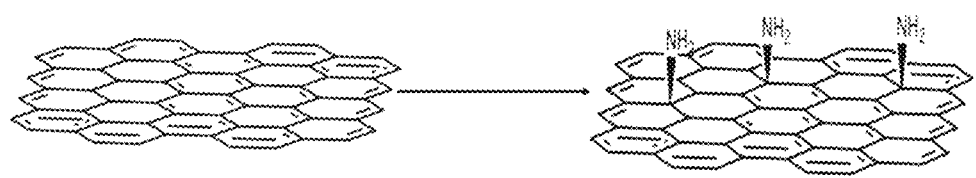
FIG. 1 is a diagram depicting an aminated graphene in accordance with an embodiment of the present invention.

Amination of graphene is performed using urea with a high boiling point solvent under reflux (FIG. 1). This allows for the synthesis to be easily scaled up, and for the reaction to be performed at 1 atmospheric pressure. Direct amination of exfoliated graphene eliminates the need for pre-functionalization, and high-pressure reaction vessels. The use of a high boiling point solvent, like ethylene glycol, makes it easy to synthesize using ambient pressure.

This study shows the successful amination of pristine graphene using a mixture of ethylene glycol and urea under reflux at 180° C. and 1 atmospheric pressure where reflux may be in air or in inert conditions.

Figure 2:
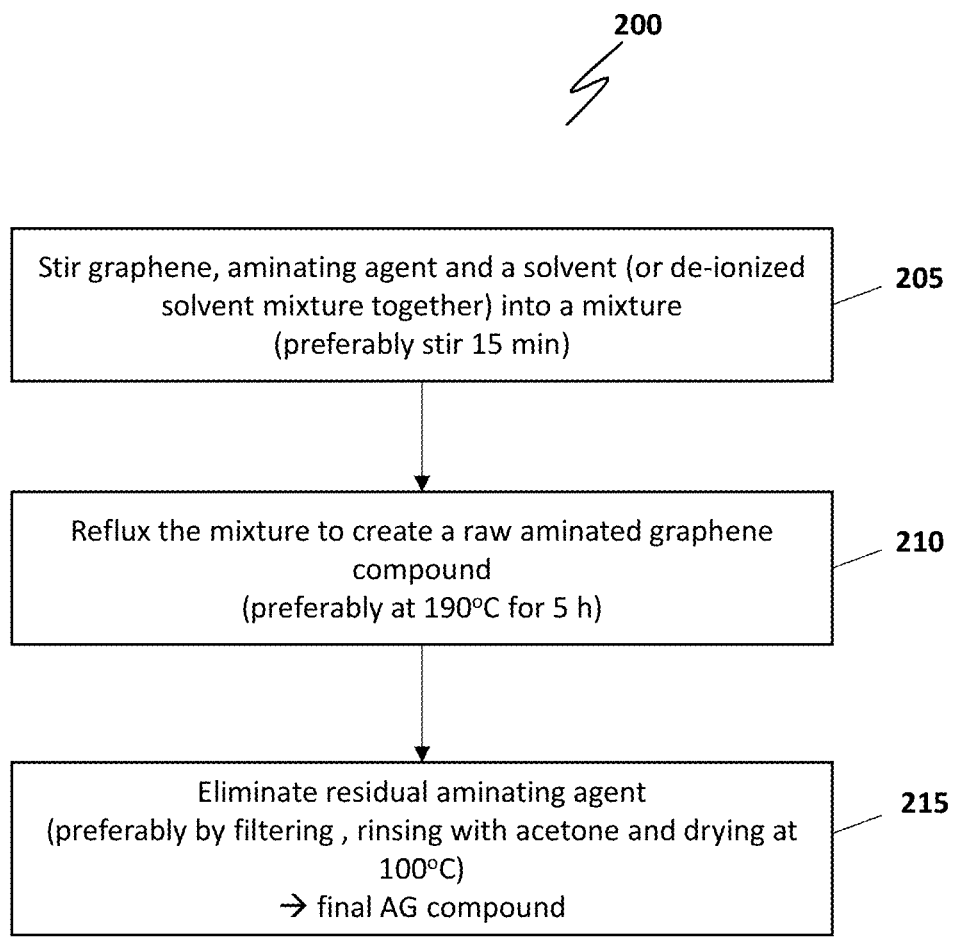
FIG. 2 is a block diagram of an aminating method to make an animated graphene in accordance with an exemplary embodiment of the present invention.

In an exemplary embodiment, amination of graphene is performed by method 200 shown in FIG. 2. At step 205, graphene, an aminating agent and a solvent are mixed together to form a mixture. In an alternate embodiment, a de-ionized water-solvent mixture is mixed with the graphene and the aminating agent. The mixture is preferably stirred for about 15 minutes. At step 210 the mixture is reacted by reflux at a specific temperature and for a fixed time to create a raw aminated graphene compound. At step 215, residual aminating agent is eliminated, preferably by filtering, rinsing and drying, to produce the final aminated graphene powder.

Graphene Nanoplatelets were purchased from XG Sciences company. Acetone (ACS Reagent Grade), Isopropanol (IPA, 99.5%, ACS Reagent Grade), Urea (ACS Grade), Ethylene Glycol (Certified Grade), and N,N-Dimethylformamide (DMF, ACS Reagent Grade, >99.8%) were purchased from Fisher Scientific. Ethanol (190 proof) was purchased from PHARMCO-AAPER. 1-Methyl-2-Pyrrolidinone (NMP, Spectroscopy Grade 99.0%) was obtained from ACROS Organics. Potassium Bromide (KBr, FTIR grade) was purchased from Sigma Aldrich. Deionized water (DI-$H_2O$) was obtained from the lab. All chemicals were used as received, without any further purification. Functionalization of graphene with —$NH_2$ groups was performed under reflux using urea as an amine source. In an embodiment of amination of graphene following the method 200, graphene, urea, and ethylene glycol were added to a 100 mL round bottom flask and stirred for 15 minutes. The mixture was then refluxed at 180° C. for 5 h, and let it cool to room temperature. Aminated graphene was then filtered, rinsed with acetone, and dried at 100° C. in order to eliminate any residual urea or ammonia present in the sample. After filtration, the filtrate was able to be re-used. Functionalization using the recycled solvent followed the same procedure as above.

Fourier transform infrared (FT-IR) spectroscopy was performed using Nicolet Avatar 360 FT-IR in order to confirm presence of functional groups. Thermal gravimetric analysis (TGA) was performed using a TA instruments Q600 simultaneous TGA/DSC in order to determine the thermal stability of the material. Raman spectra was taken using a Thermo Fisher DXR Raman spectrometer with a 532 nm laser source. UV-Vis analysis was performed with a Shimadzu UV-1601PC spectrophotometer.

Figure 3:
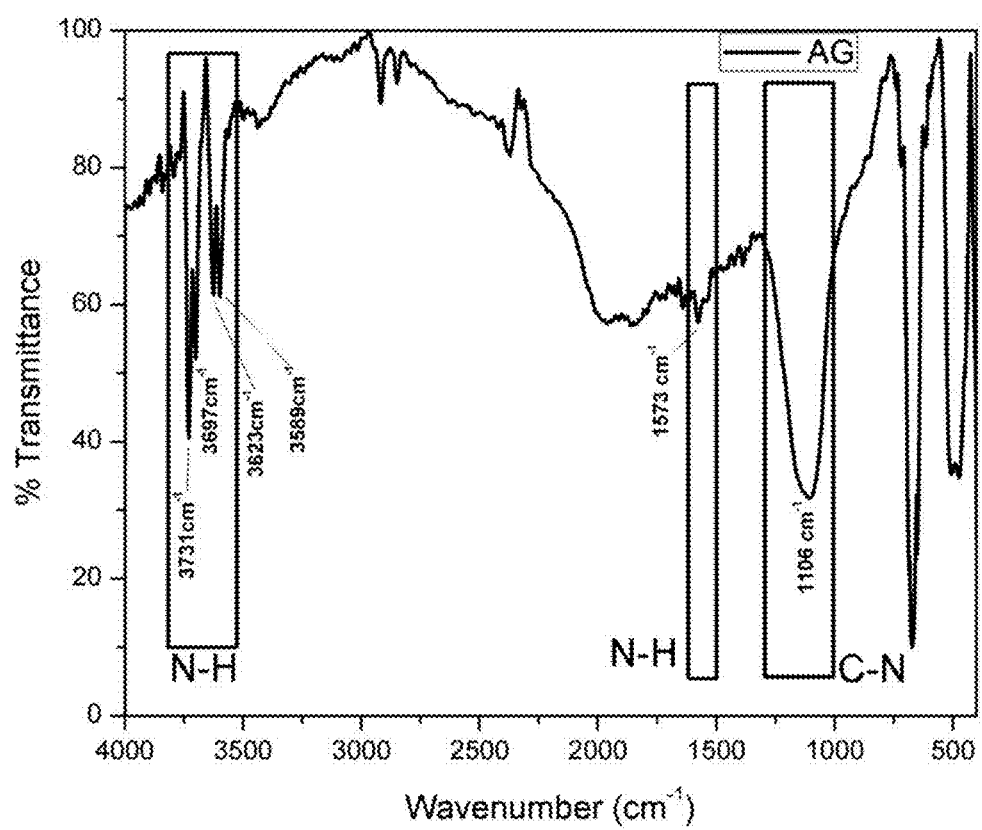
FIG. 3 is a plot of the FTIR Spectra of an amine functionalized graphene synthesized using a reflux method according to an embodiment of the present invention.

In order to confirm the presence of amine groups on the surface FT-IR analysis was performed on the material. FIG. 3 shows the analysis on the final material after washing and drying. Bands at 3731-3589 and 1573 $cm^{-1}$ correspond to the N—H bending and stretching respectively. The band at 1106 $cm^{-1}$ corresponds to C—N stretching.

Figure 4:
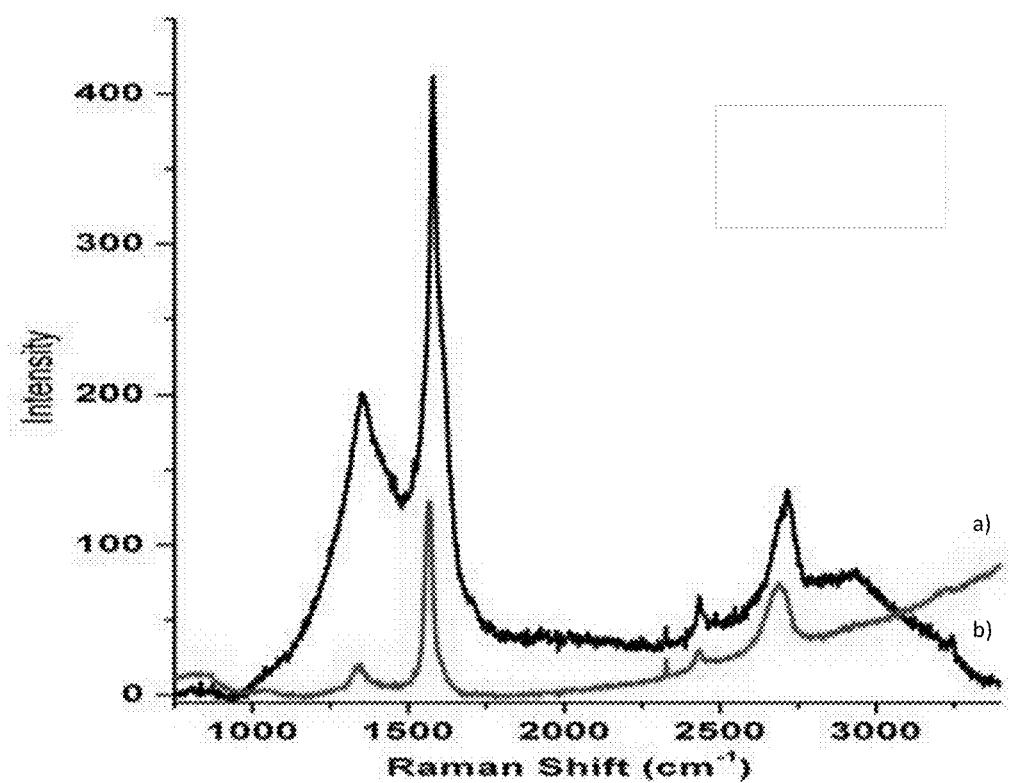
FIG. 4 is a graph showing the Raman spectra of a) G and b) AG according to an embodiment of the present invention.

Raman analysis performed on both pristine and aminated graphene showed that the introduction of the amine groups increases the disorder of the graphitic backbone (FIG. 3). This was established by calculation of the $I_D/I_G$ ratio of each sample. Pristine graphene had a ratio of 0.2 while aminated graphene had a ratio of 0.4 (FIG. 4a-b). A ratio below 1 indicates that the aminated material has still maintained a high percentage of the graphitic backbone.

Figure 5:
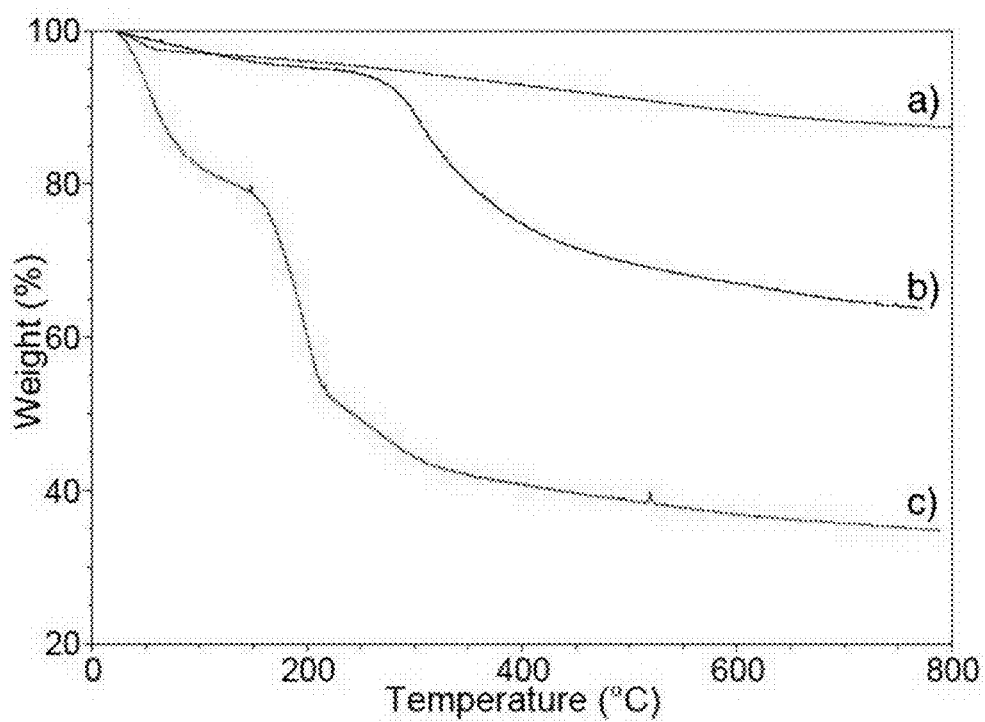
FIG. 5 is a graph showing TGA analysis of graphene materials (a) G, (b) AG and (c) GO according to an embodiment of the present invention.

Thermal analysis was also performed on the amine functionalized graphene, and compared to GO to confirm that there was no presence of oxygen functionalities on the surface. The TGA analysis (FIG. 5a-b) shows that from 25° C.-300° C. the thermal degradation follows similar to graphene and then there is a sharp weight loss at approximately 300° C. corresponding to the loss of amine groups from the graphene surface (FIG. 5b). This weight loss agrees with what has been reported in previous literature regarding thermal analysis of aminated graphene.

Prior work synthesizes aminated graphene through the treatment of GO with an amine source. In order to confirm that no oxygen functionalities were present on the surface the TGA of $NH_2$-G was compared to that of GO. Thermal analysis of GO shows three distinct areas of weight loss corresponding to the loss of —OH, —COOH, and epoxy groups from the surface (FIG. 5c). None of these occur in the sample of AG synthesized by reflux.

Figure 6:
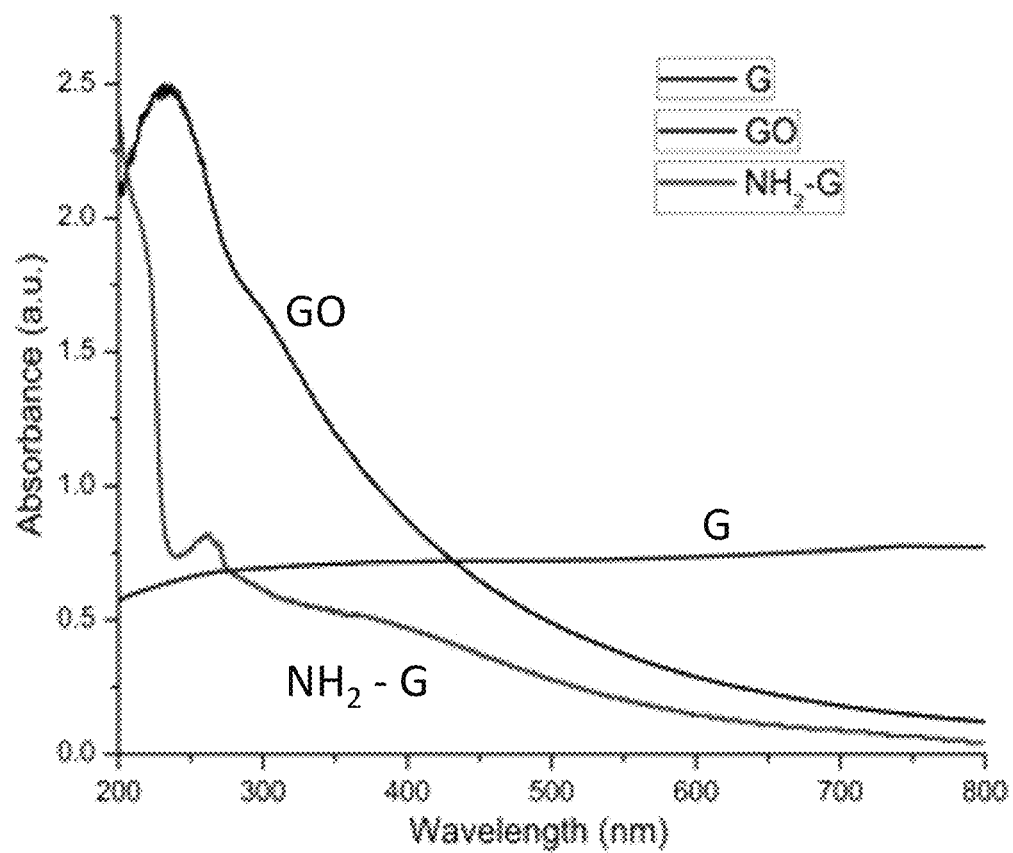
FIG. 6 is a graph showing absorbance vs. wavelength in a UV-Vis analysis of GO (Black), AG (Red) and G (blue)

UV-Vis of the amine functionalized graphene was performed. FIG. 6 shows the analysis and how the functionalized graphene compares to pristine graphene material. Upon functionalization with —$NH_2$ groups there is a distinct absorption peak at 275 nm whereas the pristine material displays no absorption at all. Dispersion studies were performed on the AG in order to observe its effects on stability in various organic solvents. FIG. 7 shows the dispersions in various organic solvents at Day 0 (top) and then after Day 60 (bottom).

It was observed that introduction of —$NH_2$ groups on the surface helped to enhance stability in the organic solvents: NMP, DMF, and ethylene glycol. Dispersion in NMP remained dispersed due to the interaction between the amine groups on the surface and the conjugated pi-orbitals present in the NMP solvent. The dispersion with ethylene glycol did not crash out due to interactions between the terminal hydroxyl groups in the solvent and the amine groups on the surface of AG. The settlement of AG in water, ethanol, IPA and acetone could be due to the low concentration of amine groups on the surface of the graphene. If the concentration is high, it could have high dispersion stability with water, ethanol while it will lower the stability in nonpolar solvent like xylenes. When there are too many polar (i.e. amine) groups on the surface of the graphene, then the material will fall out of dispersion in nonpolar solvent.

A simple reflux method was discovered to synthesize aminated graphene. The new method uses ethylene glycol as solvent and urea as amination reagent to form aminated graphene. This procedure also eliminates the need for pre-functionalization to GO and caustic amines, such as ethylenediamine, used for the amination. UV-Vis analysis showed that amination of graphene can enhance the UV absorbance capability of graphene. The synthesized material showed that it can absorb in the range of 200-300 nm. Dispersions in various organic solvents showed that introduction of amine functional groups on graphene helped to enhance dispersion stability in EG, NMP, DMF and Xylenes. Amine functionalized graphene can then be composited with urethane or epoxy resins to form a barrier coating for corrosion protection. Some embodiments of the present invention are realized as a coated surface, wherein the coated surface is a surface of an article having an applied coating comprising the amine functionalized graphene resulting from the disclosed method 200 for aminating graphene.

The illustration of the process for aminating graphene in the FIGS. 1-7 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

II. FACILE DIRECT FLUORINATION METHOD OF PRISTINE GRAPHENE NANOPARTICLES

Fluorinated graphene can have enhanced hydrophobicity and durability so it can give benefits as a coating component to resist metal surface from corrosion. In the direct gas fluorination process disclosed herein, pristine graphene (mechanically exfoliated) is directly exposed to fluorine gas ($F_2$) in order to produce fluorinated graphene (FG). In particular, a facile process is described for direct gas fluorination of graphene using a dilute $F_2$/inert gas mixture at room temperature at variable pressure and time.

The inert gas may be Helium, Nitrogen, Argon, Krypton, or Xenon. In the example embodiment, $N_2$ gas is used as the inert gas.

Figure 8:
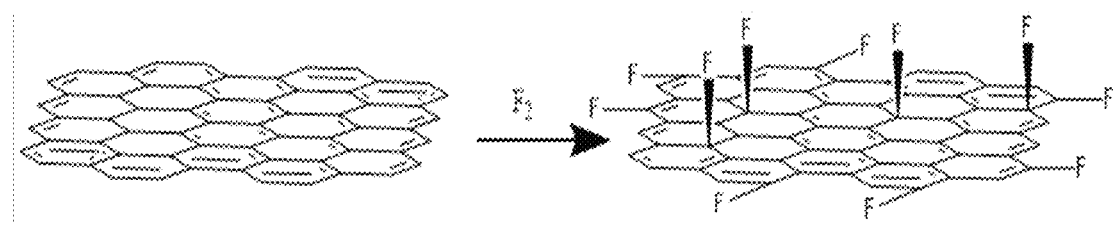
FIG. 8 is a diagram depicting a fluorinated graphene according to an embodiment of the present invention.
Figure 9:
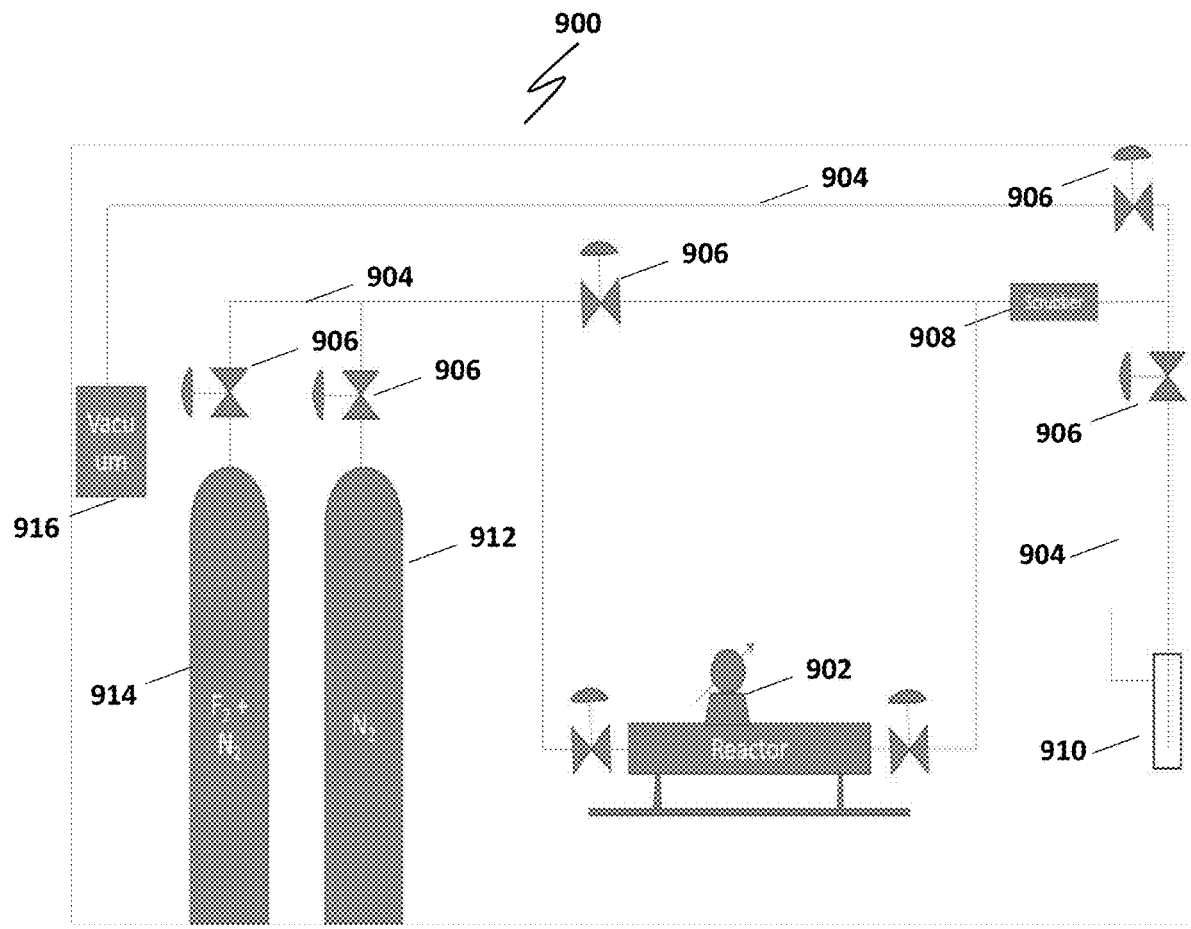
FIG. 9 is a schematic of the apparatus used for fluorination of graphene in accordance with the present invention.

Direct gas fluorination of pristine graphene (FIG. 8) was conducted in a sealed reactor with $F_2/N_2$ gas mixture at room temperature with varying time periods to obtain fluorinated graphene (FG). FIG. 9 outlines the schematic of the reactor apparatus 900 used to perform direct gas fluorination. The reactor apparatus includes a reactor 902, connected by a lines 904 and valves 906 to a scrubber 908, a vent 910, a source of $N_2$ gas 912, a source of $F_2/N_2$ gas 914 and a vacuum pump 916 as shown in FIG. 9.

Figure 10:
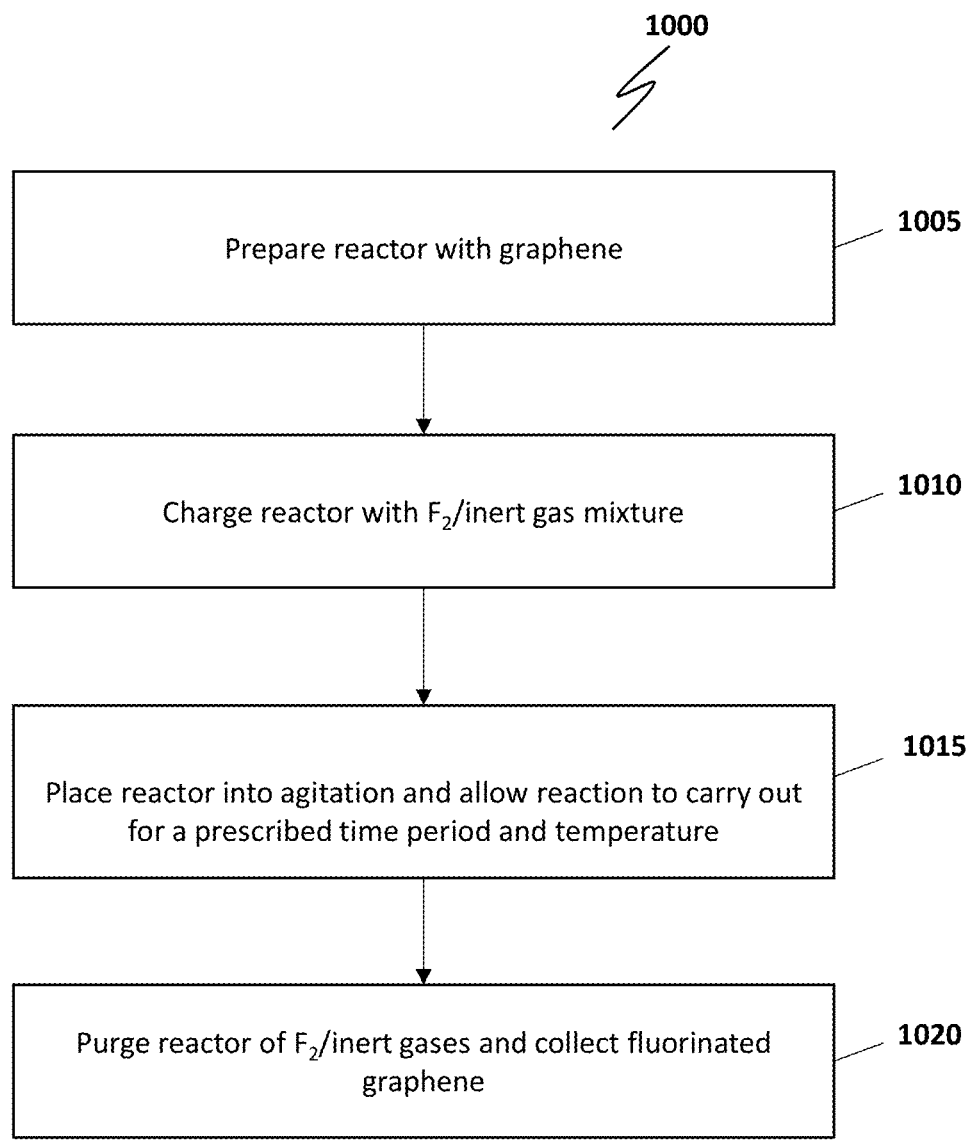
FIG. 10 is a block diagram of a fluorinating method to make a fluorinated graphene in accordance with another embodiment of the present invention.

An embodiment of direct gas fluorination of pristine graphene is process 1000, shown in FIG. 10. Process 1000 is performed in a sealed reactor with $F_2$/inert gas mixture at room temperature with varying time periods. At step 1005 graphene is placed inside the reactor and the reactor lid is closed. The reactor is evacuated via the vacuum pump and then filled with an inert gas until the pressure reaches a fixed pressure without further fluctuation. At step 1010 the reactor is emptied of the inert gas and charged with fluorination agent ($F_2$/inert gas mixture). At step 1015, the reactor is put into agitation mode and the reaction allowed to continue for a fixed time period and temperature (preferably 24 hours at room temperature). At step 1020, after a fixed time the reaction is pacified and purged, then fluorinated graphene is collected.

For example, we placed 100 mg of a pristine graphene purchased from X G Sciences inside a Teflon tube sample holder which was further placed inside the reactor. The reactor lid was closed. The reading at the pressure gauge attached to the reactor is zero at this time. The reactor was then evacuated by applying vacuum for 15 minutes. It was then filled with $N_2$ gas until the pressure reached 15 psi. Reactor was kept in this pressure for another 15 minutes to observe any change in or lowering of pressure. This was done to check the seal of the reactor before we start any fluorination. Once the reactor seal was checked the reactor was again evacuated by applying vacuum. After the reactor was emptied, the outlet valve of the reactor was closed and inlet valve was opened to fill the reactor with fluorination agent ($F_2/N_2$ gas mixture, $F_2:N_2$=5:95%, Nova Gas). The reactor was then put into agitation mode and allowed the reaction to continue for 24 hours at room temperature. After 24 hours, the reaction was pacified by slowly venting the gas from the reactor through a scrubber. The system was purged again with a steady flow of nitrogen to ensure the removal of unreacted $F_2$ and evolved HF, if any, from the reactor after which the reaction vessel was opened and fluorinated graphene was collected and kept in sealed container for characterization and/or dispersion study. The procedure was repeated allowing the reaction to run for 48 hours at room temperature at 15 psi.

Fluorinated graphene was characterized by FTIR, thermogravimetric analysis (TGA) energy dispersive x-ray analysis (EDX), UV-Vis analysis, and Raman spectroscopy and compared with pristine graphene to ensure the incorporation of fluorine in graphene.

Fourier transform infrared (FT-IR) spectroscopy was performed using Nicolet Avatar 360 FT-IR in order to confirm presence of functional groups. Thermal gravimetric analysis (TGA) was performed using a TA instruments Q600 simultaneous TGA/DSC in order to determine the thermal stability of the material and to confirm that there was no presence of oxygen groups in the sample. Energy dispersive x-ray analysis (EDX) was performed using a ZEISS Leo variable pressure scanning electron microscope. Raman spectra were taken using a Thermo Fisher DXR raman spectrometer with a 532 nm laser source. UV-Vis analysis was performed with a Shimadzu UV-1601PC spectrophotometer.

Figure 11:
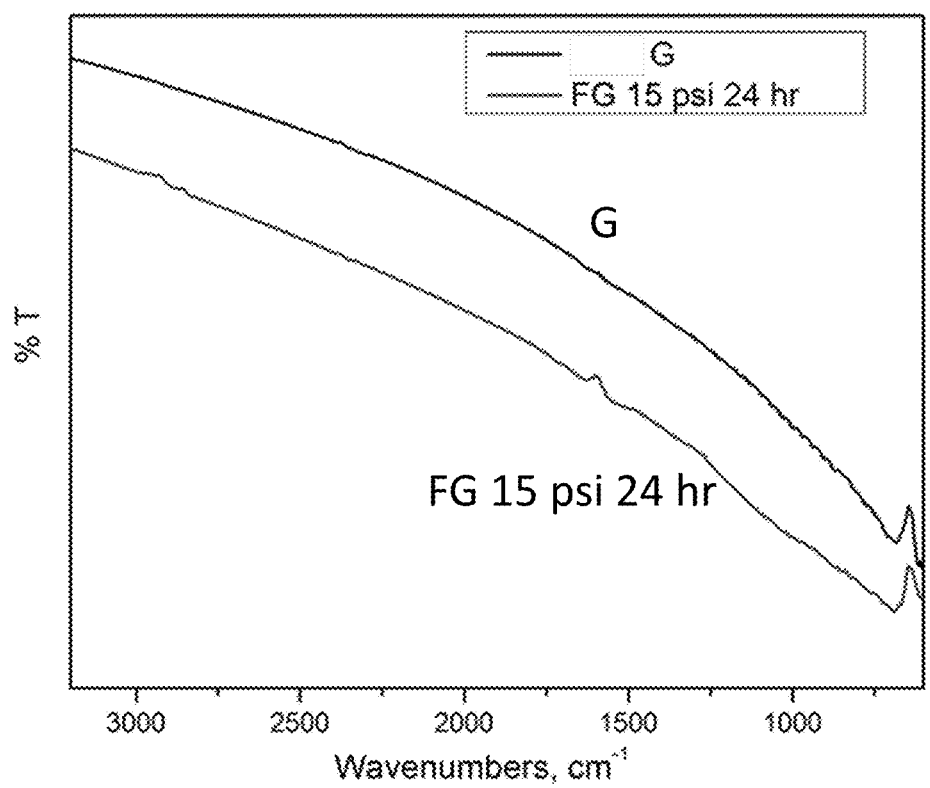
FIG. 11 is a FTIR spectrum of pristine G vs fluorinated graphene FG.

FTIR spectrum of pristine graphene (G) vs. fluorinated graphene (FG) are shown (FIG. 11) in which fluorinated graphene shows —C=$CF_2$ and —$CF_3$ peaks at ~1625 $cm^1$ and ~1100 $cm^{-1}$ respectively. Pristine graphene does not show any of these peaks. These results are in agreement with the previous report by Sato, Y., et al[51] and Maiti, J., et al[52].

Figure 12:
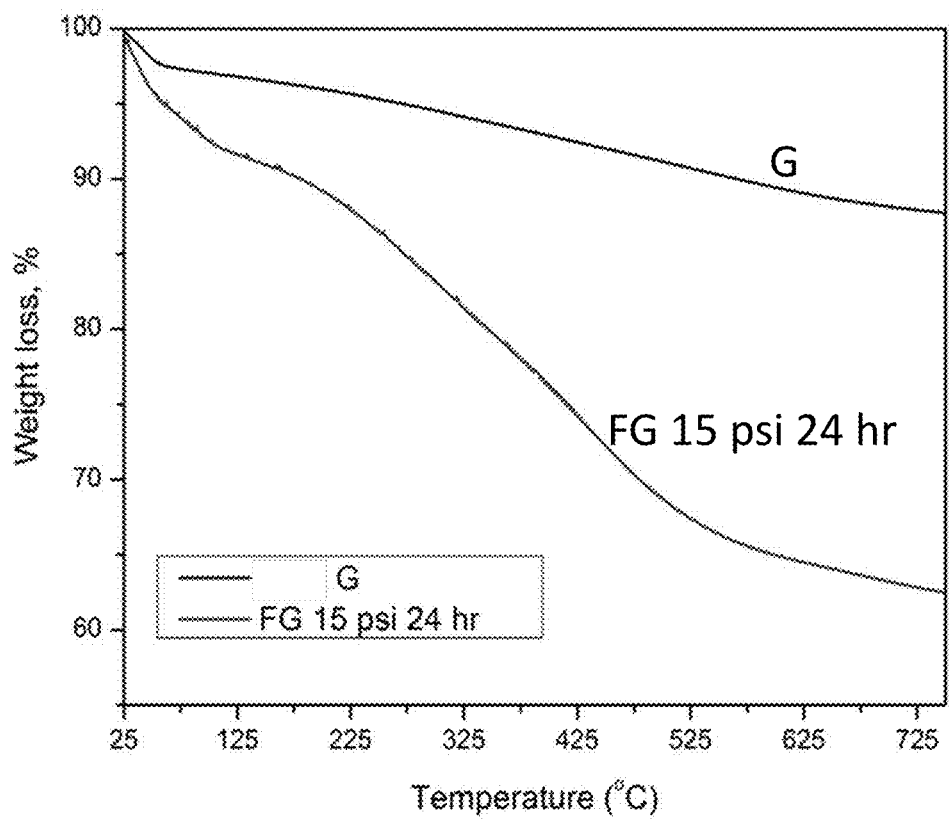
FIG. 12 is a graph showing TGA of pristine G vs. FG prepared at 15 psi 24 hrs.

FIG. 12 shows a thermal degradation profile of pristine G vs. fluorinated graphene. Fluorination is evident by the sharp degradation compared to the pristine graphene samples. The small weight loss observed at approximately 450° C. corresponds to the loss of fluoride groups from the FG.

Figure 13:
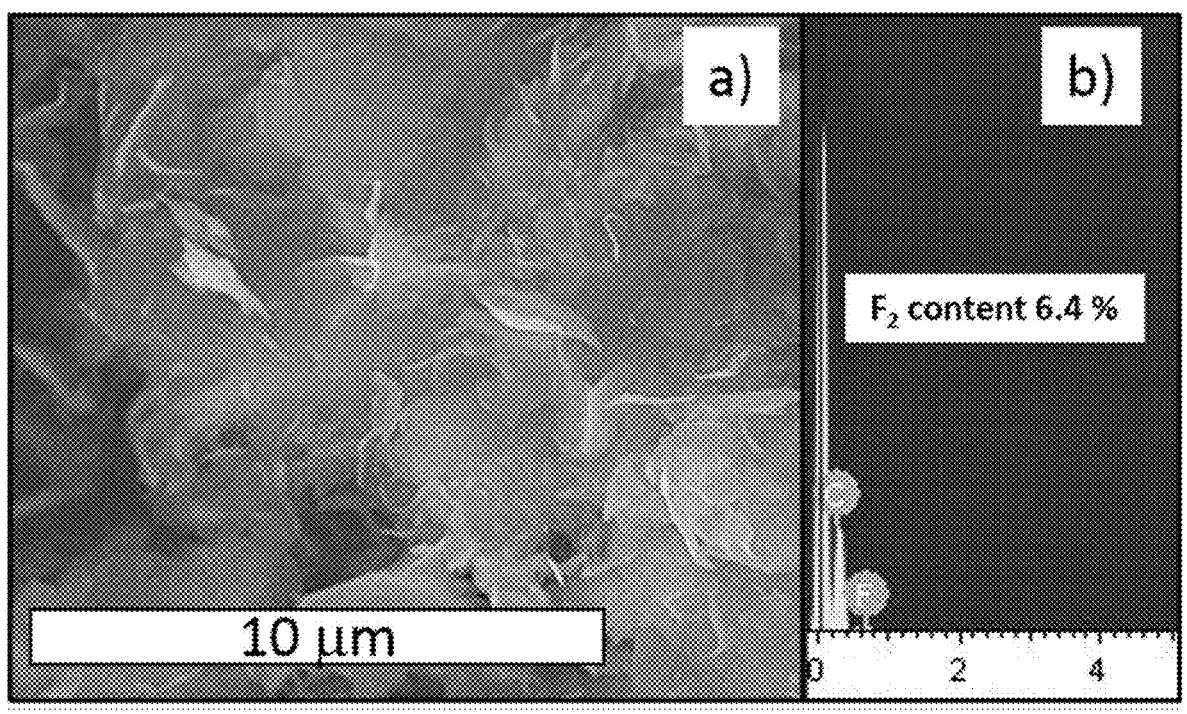
FIG. 13 is a graph showing a) SEM of FG 15 psi 24 hours (b) EDX analysis of same sample.

FIG. 13a-b shows a SEM of FG prepared at 15 psi and 24 hours, an EDX analysis of same sample. EDX analysis also confirmed the presence of fluorine in the fluorinated sample. The 15 psi 24-hour fluorinated sample show 6.4 wt % of fluorine content which was measured by EDX.

Figure 14:
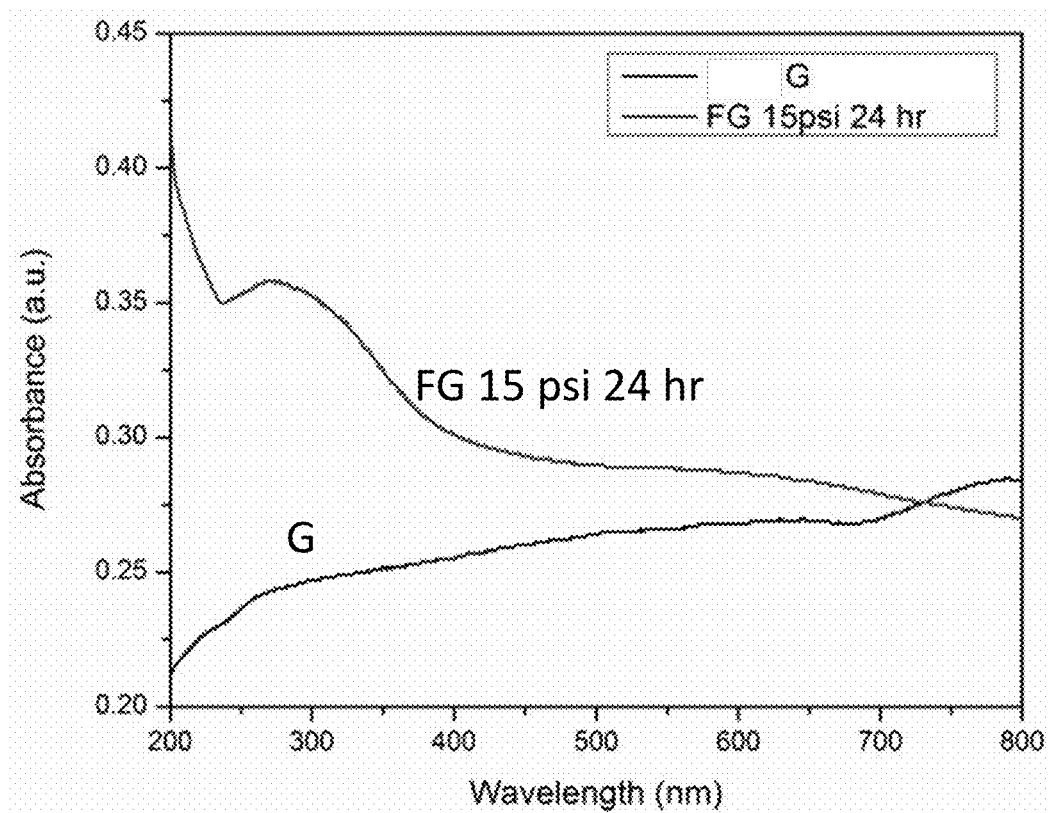
FIG. 14 is a graph showing UV-Vis analysis of pristine graphene (G) vs fluorinated graphene (FG-15 psi 24 hrs).

FIG. 14 shows an UV-Vis analysis of FG compare to pristine graphene. It shows absorption peak between 200-

400 nm indicating that FG has the capacity to absorb UV radiation within this bandwidth. This material can be a promising additive to yield UV durable polymer coatings due to its ability to absorb in the UV region.

Figure 15:
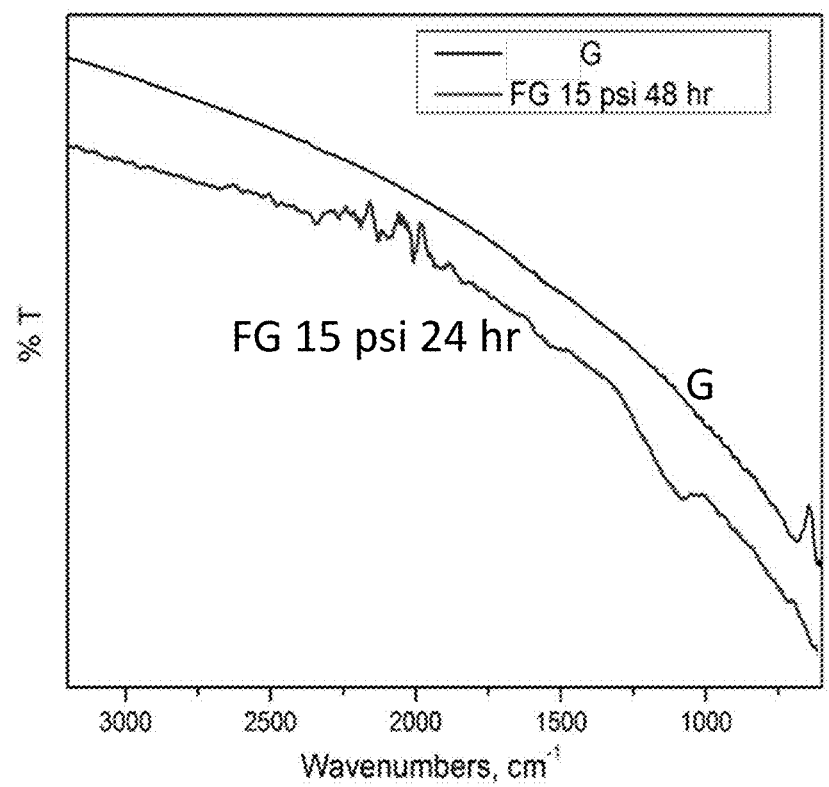
FIG. 15 is a graph showing FTIR spectrum of pristine G vs fluorinated graphene FG.

In FTIR analysis, fluorinated graphene shows —C=$CF_2$ and —$CF_3$ peaks at ~1625 $cm^{-1}$ and ~1100 $cm^{-1}$ respectively and pristine graphene does not show any of these peaks (FIG. 15).

Figure 16:
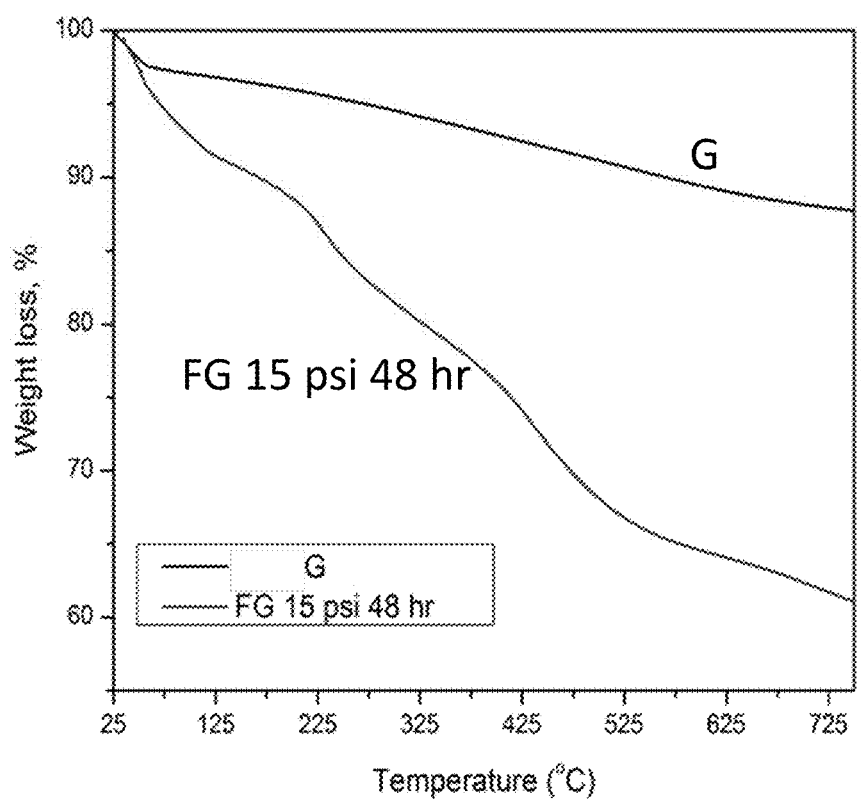
FIG. 16 is a graph showing TGA of pristine G vs FG prepared at 15 psi 48 hours.

TGA study shows the degradation profile of pristine vs fluorinated graphene (FIG. 16). Fluorination is evident by the sharp degradation compare to the pristine graphene samples. Weight loss observed at approximately 425° C. corresponds to the loss of fluoride groups from the surface of the graphene.

Figure 17:
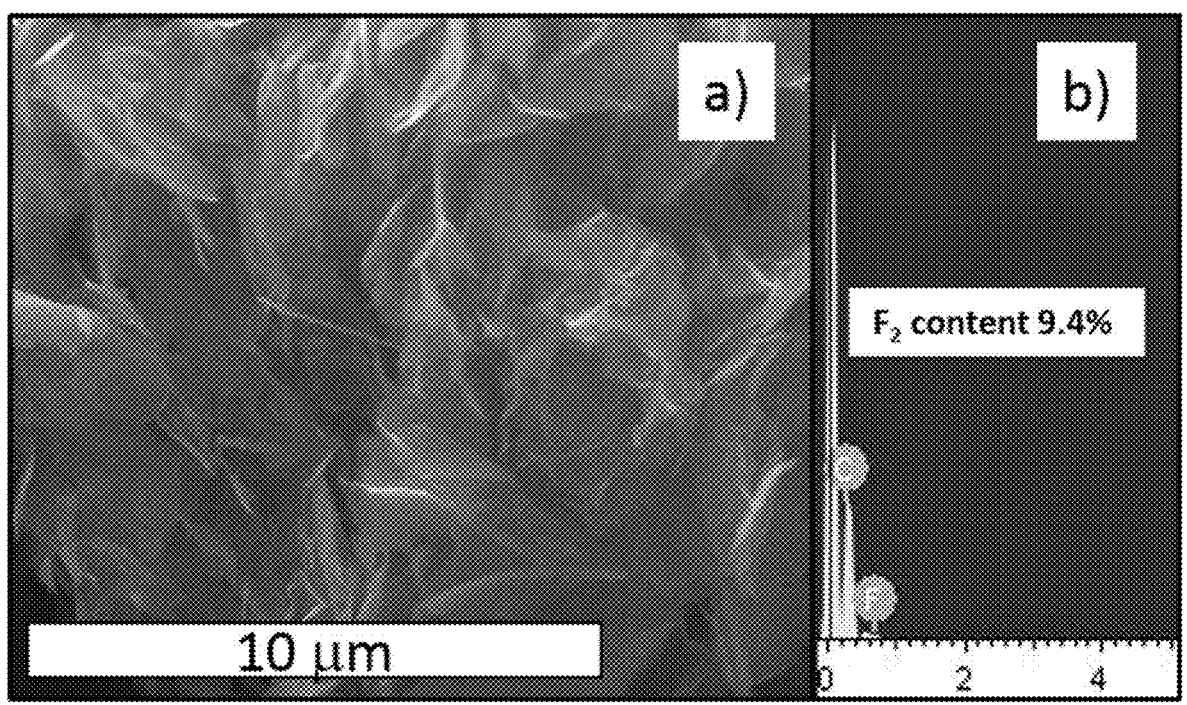
FIG. 17 is a graph showing a) SEM of FG 15 psi 48 hours (b) EDX analysis of same sample.

FIGS. 17a-b show SEM and EDX analyses. EDX analysis shows fluorinated graphene (FG) prepared at 15 psi for 48 hours contains 9.4 wt % of fluoride as fluorine content.

Figure 18:
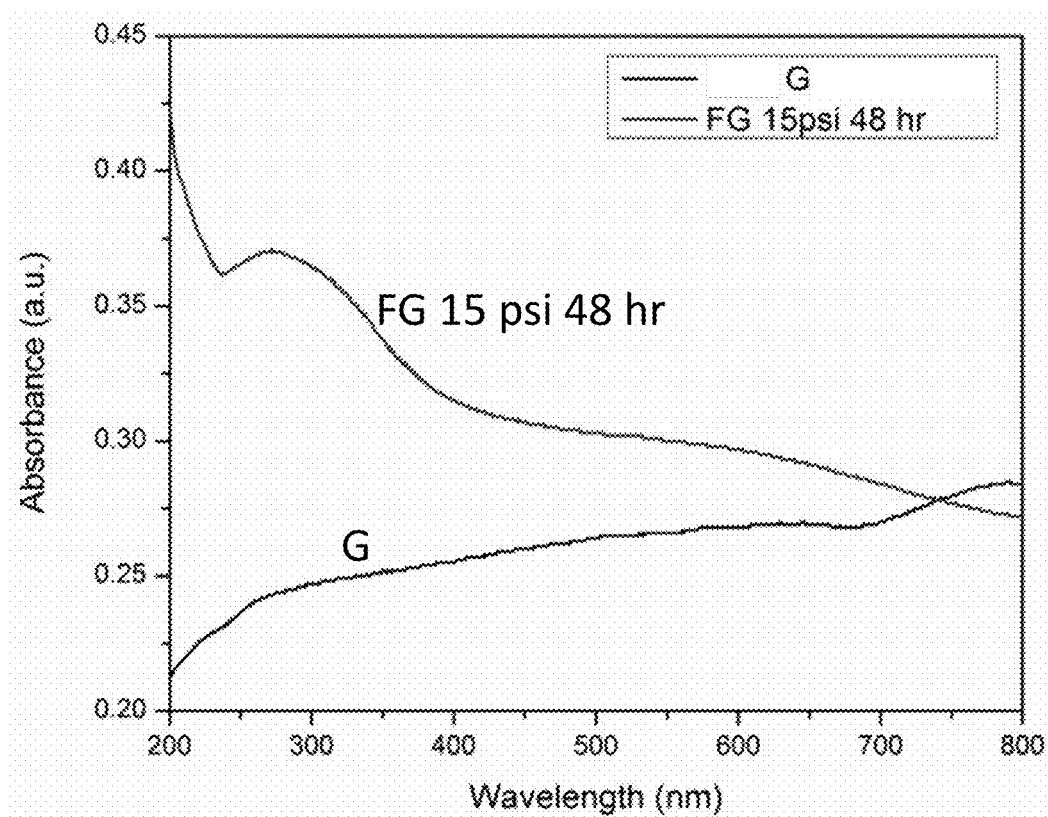
FIG. 18 is a graph showing UV-Vis analysis of pristine graphene G vs fluorinated graphene (FG-15 psi 48 hrs).

From UV-Vis analyses of G and FG, it is observed that FG prepared at 15 psi 48 hrs shows higher intensity absorption peak between 200-400 nm than G sample. FG thus have a higher capacity to absorb UV radiation within this bandwidth (FIG. 18).

In summary, the study showed that direct gas fluorination of exfoliated pristine graphene successfully produces fluorinated graphene (FG). Chemical characterization by confirmed the presence of fluoride groups in graphene. Through adjusting the reaction time or pressure, we draw a conclusion that we are also able to vary the degree of fluorination. Addition of this fluorinated graphene into a coating, engineering plastic, or composite coating can help to achieve corrosion protection utilizing enhanced hydrophobicity from FG. Some embodiments of the present invention are realized as a coated surface, wherein the coated surface is a surface of an article having an applied coating comprising the amine functionalized graphene resulting from the process 1000 for fluorinating graphene.

The illustration of the process for fluorinating graphene in the FIGS. 8-18 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

The terminology used herein was chosen to best explain the principles of the embodiment, the practical application or technical improvement over technologies found in the marketplace, or to enable others of ordinary skill in the art to understand the embodiments disclosed here. All of the compositions and methods disclosed and claimed herein can be made and executed without undue experimentation in light of the present disclosure. The descriptions of the various embodiments of the present invention were presented for purposes of illustration, but are not intended to be exhaustive or limited to the embodiments disclosed. For example, variations may be applied to the compositions and methods and in the steps or in the sequence of steps of the methods described herein. More specifically, it will be apparent that certain agents which are both chemically and physiologically related, may be substituted for the agents described herein while the same or similar results would be achieved. All such similar substitutes and modifications apparent to those skilled in the art are deemed to be within the spirit, scope and concept of the disclosure as defined by the appended claims.

III. REFERENCES

[1] Chen, J., Yao, B., Li, C. & Shi, G. An improved Hummers method for eco-friendly synthesis of graphene oxide. Carbon 64, 225-229, doi:10.1016/j.carbon.2013.07.055 247 (2013).

[2] Chen, J., Li, Y., Huang, L., Li, C. & Shi, G. High-yield preparation of graphene oxide from small graphite flakes via an improved Hummers method with a simple purification 250 process. Carbon 81, 826-834, doi: 10.1016/j.carbon.2014.10.033 (2015).

[3] Raman, R. K. S. & Tiwari, A. Graphene: The Thinnest Known Coating for Corrosion Protection. Jom-Us 66, 637-642, doi:10.1007/s 11837-014-0921-3 (2014).

[4] Peplow, M. The quest for supercarbon. Nature 503, 327-329 (2013).

[5] Novoselov, K. S. et al. A roadmap for graphene. Nature 490, 192-200, doi:10.1038/naturel 1458 (2012).

[6] Chen, C. et al. Achieving high performance corrosion and wear resistant epoxy coatings via incorporation of noncovalent functionalized graphene. Carbon 114, 356-366 (2017).

[7] Lee, J. H. et al. Restacking-Inhibited 3D Reduced Graphene Oxide for High Performance Supercapacitor Electrodes. Acs Nano 7, 9366-9374, doi:10.1021/nn4040734 (2013).

[8] Kim, J., Carlin, J. M., Smith, S. A., Yin, J. & Joo, Y. L. Thermal restacking of graphene structure to improve lithium-air battery cyclability. Electrochemistry Communications 70, 43-46 (2016).

[9] Chen, Y., Zhang, X. O., Zhang, D. C., Yu, P. & Ma, Y. W. High performance supercapacitors based on reduced graphene oxide in aqueous and ionic liquid electrolytes. Carbon 49, 573-580, doi: 10.1016/j.carbon.2010.09.060 (2011).

[10] Tan, B. & Thomas, N. L. A review of the water barrier properties of polymer/clay and polymer graphene nanocomposites. J Membrane Sci 514, 595-612 (2016).

[11] Nine, M. J., Cole, M. A., Tran, D. N. H. & Losic, D. Graphene: a multipurpose material for protective coatings. Journal of Materials Chemistry A 3, 12580-12602, doi:10.1039/c5ta01010a (2015).

[12] Feng, W., Long, P., Feng, Y. & Li, Y. Two-Dimensional Fluorinated Graphene: Synthesis, Structures, Properties and Applications. Advanced Science 3, 1500413, doi: 10.1002/advs.201500413 (2016).

[13] Ramezanzadeh, B., Ghasemi, E., Mahdavian, M., Changizi, E. & Moghadam, M. H. M. Covalently-grafted graphene oxide nanosheets to improve barrier and corrosion protection properties of polyurethane coatings. Carbon 93, 555-573, doi:10.1016/j.carbon.2015.05.094 (2015).

[14] Chaudhry, A. U., Mittal, V. & Mishra, B. Inhibition and promotion of electrochemical reactions by graphene in organic coatings. Rsc Advances 5, 80365-80368, 280 doi:10.1039/c5ra1$^2$988e (2015).

[15] Abbas, R., Elkhoshkhany, N., Hefnawy, A., Ebrahim, S. & Rahal, A. High Stability Performance of Superhydrophobic Modified Fluorinated Graphene Films on Copper Alloy Substrates. Adv Mater Sci Eng (2017).

[16] Mo, M. et al. Excellent tribological and anti-corrosion performance of polyurethane composite coatings reinforced with functionalized graphene and graphene oxide 286 nanosheets. RSC Advances 5, 56486-56497, doi: 10.1039/C5RA 10494G (2015).

[17] Ramezanzadeh, B., Niroumandrad, S., Abmadi, A., Mahdavian, Mv. & Moghadam, M. H. M. Enhancement of barrier and corrosion protection performance of an epoxy coating through wet transfer of amino functionalized graphene oxide. Corros Sci 103, 283-304 290 (2016).

[18] Konios, D., Stylianakis, M. M., Stratakis, E. & Kymakis, E. Dispersion behaviour of graphene oxide and reduced graphene oxide. Journal of colloid and interface science 430, 108-112 (2014).

[19] Zhou, B. M. et al. Tailoring the chemical composition and dispersion behavior of fluorinated graphene oxide via CF4 plasma. Journal of Nanoparticle Research 17 (2015).

[20] Chakraborty, S. et al. High yield synthesis of amine functionalized graphene oxide and its surface properties. Rsc Advances 6, 67916-67924 (2016).

[21] Paredes, J. I., Villar-Rodil, S., Martinez-Alonso, A. & Tascón, J. M. D. Graphene Oxide Dispersions in Organic Solvents. Langmuir 24, 10560-10564, doi:10.1021/la801744a (2008).

[22] Bo, Z. et al. Green preparation of reduced graphene oxide for sensing and energy storage applications. Scientific reports (2014).

[23] Zhang, S. et al. One-step hydrothermal synthesis of reduced graphene oxide/zinc sulfide hybrids for enhanced tribological properties of epoxy coatings. Surf Coat Tech 326, 87-95, doi:10.1016/j.surfcoat.2017.07.052 (2017).

[24] Aguilar-Bolados, H. et al. Facile and Scalable One-Step Method for Amination of Graphene Using Leuckart Reaction. Chem Mater 29, 6698-6705 (2017).

[25] Navaee, A. & Salimi, A. Efficient amine functionalization of graphene oxide through the Bucherer reaction: an extraordinary metal-free electrocatalyst for the oxygen reduction 310 reaction. Rsc Advances 5, 59874-59880, doi:10.1039/c5ra07892j (2015).

[26] Lyon, S. B., Bingham, R. & Mills, D. J. Advances in corrosion protection by organic coatings: What we know and what we would like to know. Progress in Organic Coatings 102, 2-7 (2017).

[27] Wang, D. & Bierwagen, G. R. Sol-gel coatings on metals for corrosion protection. Progress in Organic Coatings 64, 327-338 (2009).

[28] Tetsuka, H., Nagoya, A. & Asahi, R. Highly luminescent flexible amino-functionalized graphene quantum dots@ cellulose nanofiber clay hybrids for white-light emitting diodes. Journal of Materials Chemistry C 3, 3536-3541, doi:10.1039/C5TC00250H (2015).

[29] Shahriary, L. & Athawale, A. A. Graphene oxide synthesized by using modified hummers approach. Int. J. Renew. Energy Environ. Eng (2014).

[30] Guerrero-Contreras, J. & Caballero-Briones, F. Graphene oxide powders with different oxidation degree, prepared by synthesis variations of the Hummers method. Materials Chemistry and Physics 153, 209-220, doi: 10.1016/j.matchemphys.2015.01.005 (2015).

[31] Zhao, Y. X., Ding, H. L. & Zhong, Q. Preparation and characterization of aminated graphite oxide for CO2 capture. Applied Surface Science 258, 4301-4307, doi: 10.1016/j.apsusc.2011.12.085 (2012).

[32] Novoselov, K. S., et al., Electric Field Effect in Atomically Thin Carbon Films. Science, 2004. 306 (5696): p. 666-669.

[33] Nair, R. R., et al., Fine Structure Constant Defines Visual Transparency of Graphene. Science, 2008. 320 (5881): p. 1308-1308.

[34] Feng, W., et al., Two-Dimensional Fluorinated Graphene: Synthesis, Structures, Properties and Applications. Advanced Science, 2016. 3 (7): p. 1500413.

[35] Chen, G., et al., Preparation and characterization of graphite nanosheets from ultrasonic powdering technique. Carbon, 2004. 42 (4): p. 753-759.

[36] Campos-Delgado, J., et al., Thermal stability studies of CVD-grown graphene nanoribbons: Defect annealing and loop formation. Chemical Physics Letters, 2009. 469 (1): p. 177-182.

[37] Yung Ho, K., et al., Thermal stability of multilayer graphene films synthesized by chemical vapor deposition and stained by metallic impurities. Nanotechnology, 2012. 23 (7): p. 075702.

[38] Rand, A. A. and S. A. Mabury, Perfluorinated Carboxylic Acids in Directly Fluorinated High-Density Polyethylene Material. Environmental Science & Technology, 2011. 45 (19): p. 8053-8059.

[39] Nair, R. R., et al., Fluorographene: A Two-Dimensional Counterpart of Teflon. Small, 2010. 6 (24): p. 2877-2884

[40] Robinson, J. T., et al., Properties of Fluorinated Graphene Films. Nano Letters, 2010. 10 (8): p. 3001-3005.

[41] Jeon, K.-J., et al., Fluorographene: A Wide Bandgap Semiconductor with Ultraviolet Luminescence. ACS Nano, 2011. 5 (2): p. 1042-1046.

[42] Lutolf, M. P. and J. A. Hubbell, Synthetic biomaterials as instructive extracellular microenvironmnents for morphogenesis in tissue engineering. Nature Biotechnology, 2005. 23: p. 47.

[43] Wang, X., et al., High-Yield Production of Highly Fluorinated Graphene by Direct Heating Fluorination of Graphene-oxide. ACS Applied Materials & Interfaces, 2013. 5 (17): p. 8294-8299.

[44] Ren, M., et al., Reduction and transformation of fluorinated graphene induced by ultraviolet irradiation. Physical Chemistry Chemical Physics, 2015. 17 (37): p. 24056-24062

[45] Zhou, M. S., C N), Liu, Daxi (Shenzhen, C N), Wang, Yaobing (Shenzhen, C N), Fluorinated Graphene Oxide and Preparation method thereof 2013, ZHOU MINGJIE, LIU DAXI, WANG YAOBING: United States.

[46] Cheng, S. H., et al., Reversible fluorination of graphene: Evidence of a two-dimensional wide bandgap semiconductor. Physical Review B, 2010. 81 (20): p. 205435.

[47] Kang, W. and S. Li, Preparation of fluorinated graphene to study its gas sensitivity. RSC Advances, 2018. 8 (41): p. 23459-23467.

[48] Bi, X., et al., Fluorinated Graphene Prepared by Direct Fluorination of N, O-Doped Graphene Aerogel at Different Temperatures for Lithium Primanry Batteries. Materials, 2018. 11 (7): p. 1072.

[49] Herraiz, M., et al., Large-scale synthesis offluorinated graphene by rapid thermal exfoliation of highly fluorinated graphite. Dalton Transactions, 2018. 47 (13): p. 4596-4606.

[50] Liang, X., et al., Facile synthesis and spectroscopic characterization of fluorinated graphene with tunable C/F ratio via Zn reduction. Applied Surface Science, 2017. 400: p. 339-346.

[51] Sato, Y., et al., On the so-called "semi-ionic" C—F bond character in fluorine-GIC. Carbon, 2004. 42 (15): p. 3243-3249.

[52] Maiti, J., et al., Fluorination of multiwall carbon nano tubes by a mild fluorinating reagent HPF6. Journal of Fluorine Chemistry, 2012. 135: p. 362-366.

What is claimed is:

1. A method for preparing an aminated graphene comprising reacting graphene with urea in a solvent or a solvent-deionized water mixture, and wherein the ratio of the graphene and the urea is in the range of 0.1-4.0 by weight.

2. The method of claim 1 wherein the graphene comprises at least one of mechanically exfoliated graphene, mechanically exfoliated graphene nanoparticles or graphene film.

3. The method of claim 2 wherein the graphene nanoparticles have a diameter in the range of 10 nm to 100 microns.

4. The method of claim 1 wherein the graphene comprises at least one of reduced chemically exfoliated graphene or reduced chemically exfoliated graphene nanoparticles.

5. The method of claim 1, wherein the mass percentage of carbon in the graphene is in the range of 99.0% 99.9%.

6. The method of claim 1, wherein the mass percentage of carbon in the graphene is greater than 99.99%.

7. The method of claim 1 wherein the solvent is selected from the group consisting of: ethylene glycol, diethylene glycol, triethylene glycol, tetraethylene glycol, propylene glycol, any high boiling glycol, a triol based solvent and combinations thereof.

8. The method of claim 1 wherein the reacting temperature is in the range of 150-250° C., at 1 atmospheric pressure, under reflux in air or under reflux in inert conditions.

9. The method of claim 1 wherein the reacting duration is in the range of 1-24 hours.

10. The method of claim 1 further comprising the step of including the aminated graphene as a component in a coating, a polymer, a composite or a polymer film.

11. The method of claim 10 wherein the coating is a urethane coating or an epoxy coating.

12. The method of claim 1 further comprising the step of including the aminated graphene as a component as a UV absorbing additive.

13. A method for preparing an aminated graphene comprising a reaction by reacting graphene with an aminating reagent in a solvent-deionized water mixture, wherein the solvent-deionized water mixture includes at least one solvent selected from the group consisting of: ethylene glycol, diethylene glycol, triethylene glycol, tetraethylene glycol, propylene glycol, any high boiling glycol, and a triol based solvent.

14. The method of claim 13 wherein the triol based solvent comprises glycerol, or wherein the solvent-deionized water mixture has a deionized water content in the range of 5%-60% by volume.

15. The method of claim 13, wherein the solvent-deionized water mixture has a deionized water content in the range of 5%-60% by volume.

16. The method of claim 13, wherein the aminating reagent is selected from the group consisting of urea, ethylenediamine, and para-phenylenediamine.

17. An aminated graphene, obtained in a reaction by reacting graphene with an aminating reagent in a solvent or a solvent-deionized water mixture, wherein the mass percentage of amine functional groups ($—NH_2$) is in the range of $1\% < —NH_2 < 50\%$, mass percentage of carbon is in the range of $30\% < C\% < 99\%$, and mass percentage of oxygen is in the range $0\% < O\% < 0.1\%$.

18. A composition selected from the group consisting of a coating, polymer, composite and a polymer film comprising the aminated graphene of claim 17.

19. The composition of claim 18 wherein the coating is a urethane coating or an epoxy coating.

20. A UV absorbing additive comprising the aminated graphene of claim 17.

* * * * *